Figure 1:
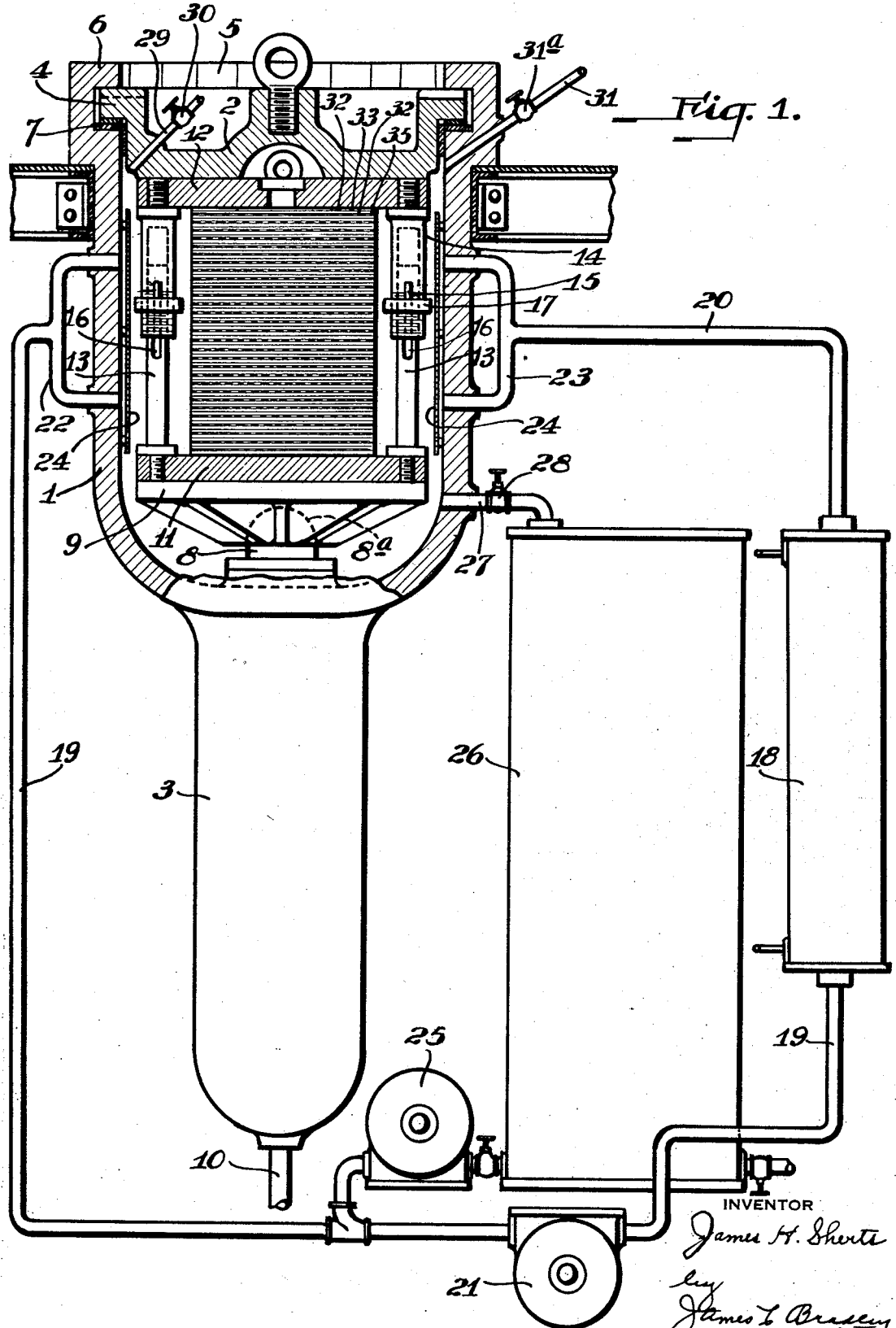

Nov. 15, 1932.  J. H. SHERTS  1,887,565
PROCESS FOR MAKING COMPOSITE GLASS
Filed March 7, 1930  2 Sheets-Sheet 2
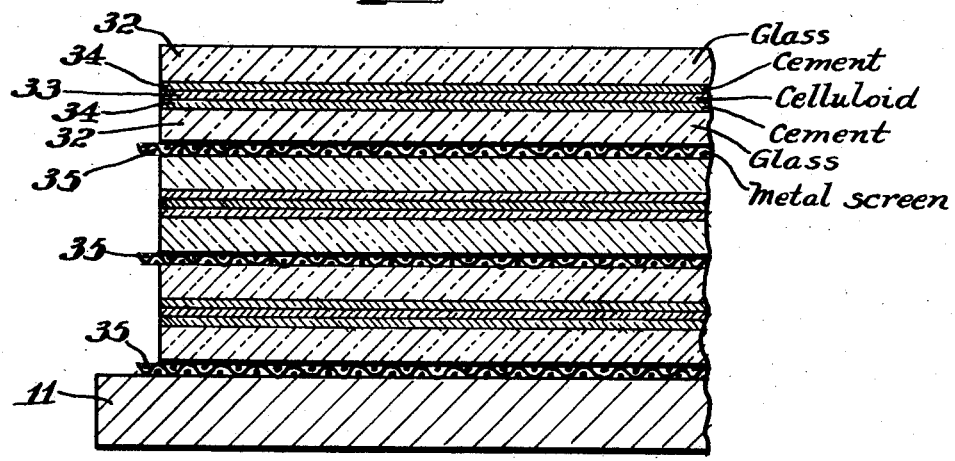
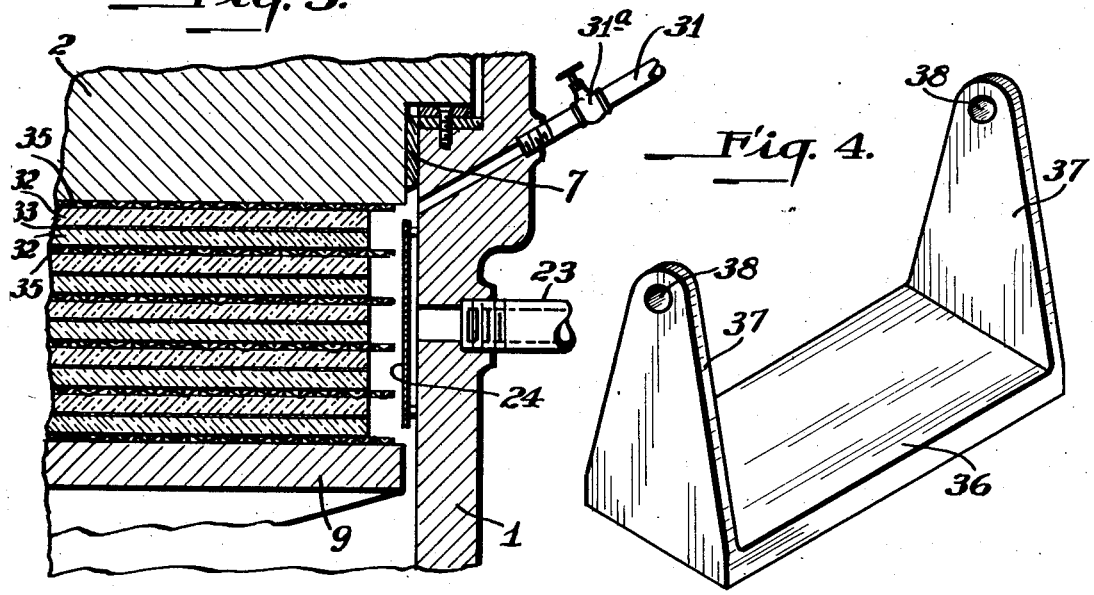
INVENTOR
James H. Sherts
by James C. Bradley
Atty Patented Nov. 15, 1932

1,887,565

UNITED STATES PATENT OFFICE

JAMES H. SHERTS, OF BRACKENRIDGE, PENNSYLVANIA, ASSIGNOR TO DUPLATE CORPORATION, A CORPORATION OF DELAWARE

PROCESS FOR MAKING COMPOSITE GLASS

Application filed March 7, 1930. Serial No. 433,944.

The invention relates to a process and apparatus for making composite glass plates and involves a development of the double pressing process and apparatus set forth in my application, Serial No. 380,277. The plates produced consist in most cases of a sheet of pyroxylin plastic, such as celluloid, to the opposite side of which glass sheets are cemented. The invention has for its principal objects the provision of an improved process and apparatus in which the double pressing and apparatus operation can be carried out in a single pressing apparatus instead of in two sets of apparatus, as has heretofore been proposed and without any shift of the articles between the two pressing operations, thus simplifying the operation and reducing the labor cost. Certain embodiments of the apparatus are illustrated in the accompanying drawings, wherein:

Figure 1 is a vertical section through one form of apparatus for carrying out the invention. Fig. 2 is a section on an enlarged scale showing a part of the stack of sheets as arranged for the pressing operation. Fig. 3 is a partial section through a modification. And Fig. 4 is a perspective view showing a modified form of rack which may be employed.

Referring to Fig. 1, 1 is a vertical pressure tank having a removable cover 2 and a cylinder 3 at the lower end of the tank. The cover 2 has lug portions 4 adapted to fit through slots 5 in the flange 6 at the upper edge of the tank, so that the cover may be secured in position by moving it down so that the lugs 4 lie beneath the flange 6 and then rotating the cover, the opposing surfaces of the cover and flange being provided with inclined surfaces to clamp the cover down. A gasket 7 serves to make the joint between the cover and tank tight. The cylinder 3 carries a plunger 8 upon which is mounted a table 9 and the plunger is moved up by admitting fluid under pressure to the bottom end of the cylinder through the pipe 10. A ball and socket connection 8a is provided between the upper end of the plunger and the table 9 so that the table can adjust itself by rocking slightly during the pressing operation.

Mounted upon the table 9 is a rack for carrying the stack of plates to be composited, such rack comprising a bottom plate 11 and a top plate 12 with telescopic securing members therebetween. These securing members each comprise a post 13 and a sleeve 14 which fits over the post. Each sleeve carries a transverse key 15 readily removable by moving the key endwise, and such key extends through slots 16 in the posts 14. Lying below the key and threaded on the sleeve is a nut 17. When the sheets to be laminated are stacked between the plates 11 and 12, the plates may be brought into clamping engagement with the sheets by screwing up the nuts slightly. When it is desired to remove the top plate, the nuts 17 are loosened and the keys 15 removed, after which the plate 12 and the sleeves may be lifted upward out of the way.

Heated liquid is supplied to the tank 1 by means of the heat exchanger 18, the pipe connections 19 and 20, and the circulating pump 21. The pipes 19 and 20 have connection with the tank by means of the Y-pipes 22 and 23 which take into the tank behind the baffles 24, 24. In order to place the liquid in the tank under the desired pressure, a pressure pump 25 is employed, which is connected to the pipe 19 and to a supply tank 26. Provision is made for draining the tank preliminary to the pressing operation by means of a pipe 27 leading from the lower end of the pressure tank, such pipe being provided with a cut-off valve 28 which is closed during the pressing operation.

A breather pipe 29 is provided to permit the escape of air from the tank when it is being filled with liquid, such pipe being provided with a cut-off valve 30. The tank is also provided with a vacuum pipe 31, connected to suitable exhausting apparatus and provided with a cut-off valve 31ª which is closed during the pressing operation.

In preparing the sheets for laminating, they are stacked, as indicated in Fig. 2, each set of sheets comprising the glass plates 32, 32, the celluloid sheet 33, and the layers of cement 34, 34. The cement may be of any desired kind, such as gelatin or casein, or it may consist of a portion of the surface of the celluloid sheet softened by a suitable plasticizer or solvent, such as acetone. Where a cement such as gelatin is used, it is preferably dried on the surface of the glass sheets before stacking the plates, as indicated in Fig. 2. Interposed between the plate 11 of the rack and the bottom set of plates is the sheet of copper gauze 35, and similar sheets of gauze 35 are interposed between each set of sheets and between the top plate 12 of the rack. The purpose of these gauze sheets is to cushion the glass sheets and reduce any tendency towards breakage and also to permit a circulation of hot liquid between the sets of sheets during the final pressing operation, as later described, this being necessary in order to heat the stack of plates with sufficient rapidity and also to render such heating uniform throughout the stack. After the stack of sheets is assembled upon the bottom plate 11 of the rack, the top plate 12 is placed in position thereover, the keys 15 are inserted, and the nuts 17 are screwed up to clamp the stack of plates lightly between the two plates 11 and 12, thus preventing any movement of the sheets upon each other during the movement of the rack from the point of assembly to the tank 1. When the rack with assembled sheets therein is brought to the tank, the table 9 is moved up by its plunger to the upper end of the tank and the rack is placed upon such table. The table is then lowered to the position indicated in Fig. 1, and the cover 2 is applied. Pressure is now applied to the plunger in the cylinder 3 to place the stack of sheets under compression, such pressure being in the neighborhood of 60 pounds per square inch between the opposing surfaces of the sheets constituting the stack. At the same time, the air in the tank is exhausted through the vacuum pipe 30 which exhaustion step promotes the escape of any air which may be entrapped between the glass and celluloid sheets, the valve 31ª is closed and the pumps 25 and 21 are operated to fill the tank 1 and continue the circulation of fluid therethrough until the desired temperature is reached. Such temperature is in the neighborhood of 235 degrees F. It is desired to bring the temperature of the celluloid sheet to a point where the material is slightly plastic, which occurs at about 200 degrees F., and in order to accomplish this more rapidly, a temperature in the liquid is employed which is in excess of 200 degrees F. As the liquid becomes heated, the pressure pump 25 is operated to bring the pressure in the tank up to about 150 pounds per square inch. This pressure gives the final pressing operation upon the sets of sheets. The preliminary pressing operation as accomplished by the plunger of the cylinder 3 serves to seal the joints at the edges of the composite plates forming the stack so that when the final relatively high compositing pressure is applied by the liquid in the tank, such liquid will not penetrate between the glass and the celluloid sheets. After the pressure in the tank has been maintained at about 150 pounds per square inch for about five minutes, the pressure pump 25 is stopped, and the contents of the tank is drained through the pipe 27, the valve 30 in the breather pipe 29 being opened at this time in order to facilitate the drainage. The cover 2 is then removed and the table 11 moved up, thus moving the rack through the top of the tank. The rack can then be removed, the plate 12 taken off and the composited plates removed from the table 11, thus completing the cycle. Water may be used as a pressing liquid in the tank 1, but a high boiling pyroxylin plastic solvent is preferred, such as diethyl glycol or dibutyl phthalate.

Fig. 3 illustrates a modification in which the rack of the Fig. 1 construction is omitted, the plates being pressed directly between the cover 2 of the tank and the table 9 carried by the plunger. In other respects, this construction is the same as that of Fig. 1. In using this apparatus, the sets of sheets are assembled directly upon the table 9, such table being pushed up by its plunger so that it lies above the top of the tank. After the assembling operation, the table is lowered into the tank, the cover 2 applied, and fluid is admitted to the pressure cylinder 3 to move the table up so that the sets of sheets are placed under compression between the table and the cover. In carrying out this operation, the gauze sheets 35 are employed the same as in the apparatus of Fig. 1.

Fig. 4 illustrates a modified form of rack which may be employed for carrying the sheets to and from the pressing tank in place of the rack of Fig. 1. This rack consists of a bottom plate 36 on which the sets of sheets are stacked for compositing. Plates 37, 37 are welded to the ends of the plate 36 and provided with the perforations 38, 38 by means of which the rack and its contents may be carried from an overhead crane. This rack with its contents is placed upon the table 9 in the press of the Fig. 1 construction and the compositing operation is carried out as heretofore described, the rack serving as the means for carrying the stack of sheets to be composited to and from the tank.

What I claim is:

A process of compositing a series of sets of sheets, each comprising a pair of glass sheets with an interposed sheet of pyroxylin plastic and layers of cement, which consists in superposing such sheets in a stack one above the other in a pressure chamber with their edges exposed, exhausting the air from the chamber and applying pressure to the stack of sheets so as to press the opposing surfaces thereof tightly together, then admitting heated liquid to the chamber to soften the plastic sheets slightly while the pressure on said sheets is maintained, and finally applying pressure to said liquid to increase the pressure between the opposing surfaces of the sheets.

In testimony whereof, I have hereunto subscribed my name this first day of March, 1930.

JAMES H. SHERTS.